April 26, 1932.  A. McNAB  1,855,921
SHOCK ABSORBER
Filed April 15, 1930   2 Sheets-Sheet 1

INVENTOR.
Alexander McNab.
BY John H Hanrahan
ATTORNEY.

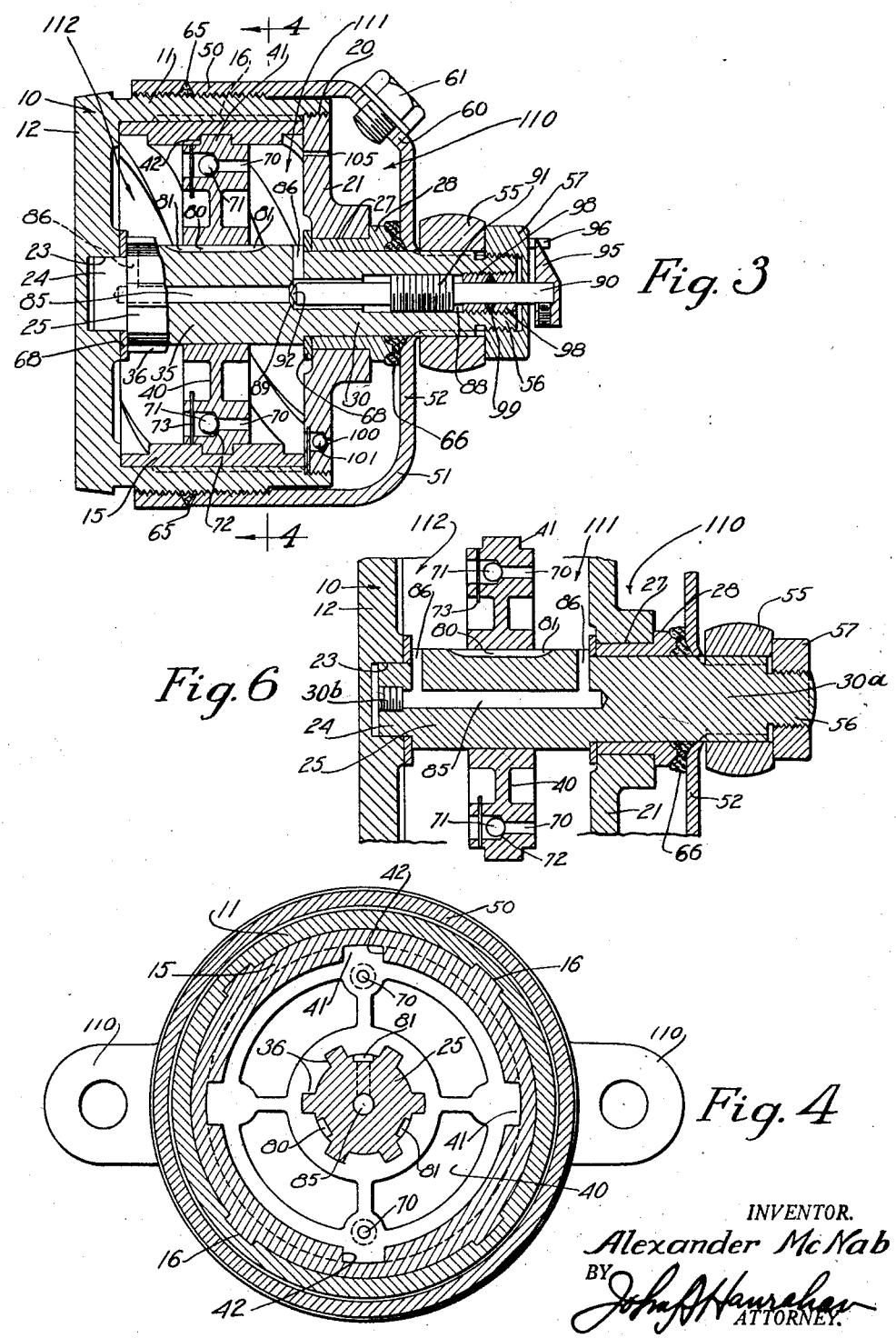

Patented Apr. 26, 1932

1,855,921

UNITED STATES PATENT OFFICE

ALEXANDER McNAB, OF BRIDGEPORT, CONNECTICUT, ASSIGNOR TO McNAB ABSORBO-LIFT, INC., OF BRIDGEPORT, CONNECTICUT, A CORPORATION OF NEW YORK

SHOCK ABSORBER

Application filed April 15, 1930, Serial No. 444,417, and in Canada March 31, 1930.

This invention relates to new and useful improvements in shock absorbers and has particular relation to shock absorbers for controlling the suspension of road vehicles and generally to improve upon the construction of shock absorber shown in my application Serial No. 347,256 filed March 15th, 1929.

A primary object of the present invention is to provide an improved shock absorber of small and compact form and which provides for maximum efficiency in checking and controlling the action of a vehicle suspension system.

Another object of the invention is to provide a shock absorber, divided into three chambers as high pressure, medium pressure and low pressure chambers, and in which on each complete stroke of the piston, fluid is drawn from the low pressure chamber into the medium pressure chamber and then pumped into the high pressure chamber thereby assuring a complete supply of working fluid for the high pressure chamber at all times.

A further object is to provide a shock absorber so constructed that it may be manufactured in quantity at a small initial expense for tool cost and wherein the wearing parts are preferably die-castings, readily removable, for replacement when worn, without detaching the device from the chassis of a vehicle or other support and without disturbing its metering adjustments.

Additional objects and advantages will become apparent from a consideration of the following detailed description taken in connection with the accompanying drawings wherein a satisfactory embodiment of the invention is shown. It is to be understood that this description and the accompanying drawings are for the purpose of making clear the construction and operation of the improved shock absorber and are not to be considered in a limiting sense. Therefore, reference must be made to the annexed claims for a definition of the limitations of the invention.

In the drawings:

Figure 3 is a sectional elevation on line 3—3 of Fig. 1.

Figure 4 is a sectional elevation on line 4—4 of Fig. 3.

Figure 6 is a sectional view showing a slight modification.

Figure 1:
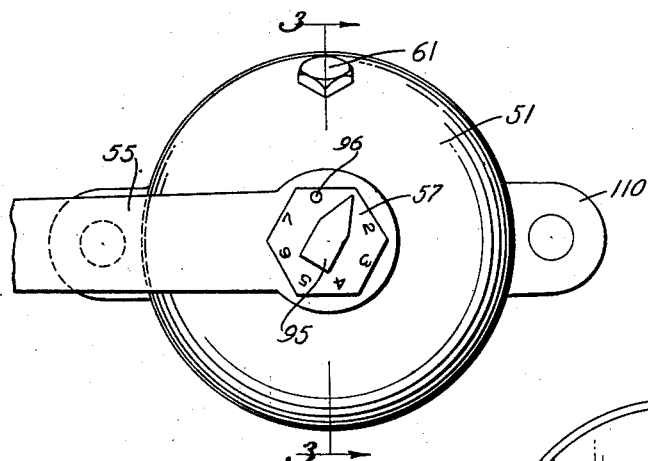
Figure 1 is a front elevation of the shock absorber.
Figure 2:
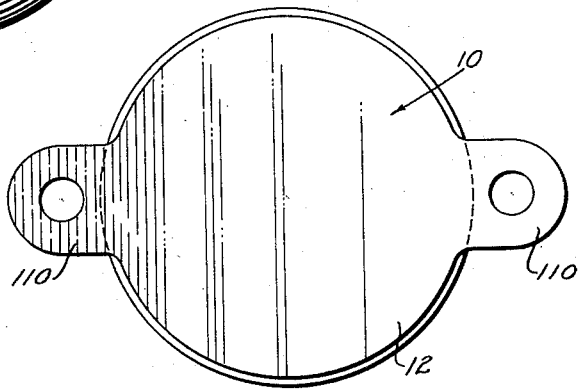
Figure 2 is a rear elevation thereof.
Figure 5:
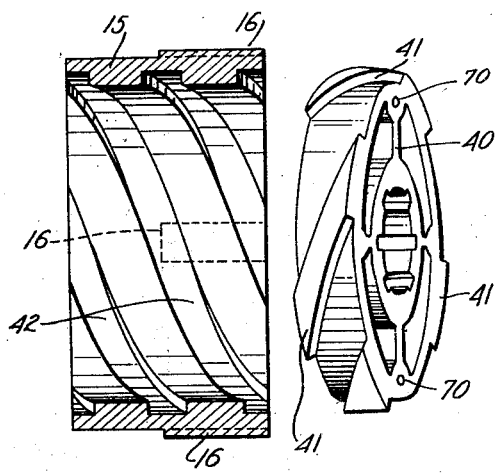
Figure 5 illustrates the cylinder lines in section and the piston in perspective.

In the construction illustrated a body member 10 is formed with a cylindrical flange-like portion 11 which is closed at one end by a disc-like portion 12, the body member thus forming a cylinder having one end open and the other end closed. The interior periphery of the cylinder is provided with a liner 15, the outer surface of the liner being formed with a number of longitudinally extending ribs 16 which engage in corresponding grooves formed in the surface of the body member, thus securing the liner against rotation relative to the body member.

It will be noted that the cylindrical portion 11 of the body member is of greater depth than the liner, and the portion of said body member 11 which projects beyond the liner is screw threaded at 20 for receiving a closure member 21 which serves to close the open end of the cylinder. The closure member 21 is thus adapted to be screwed into the body member until it abuts against the end of the liner, the other end of the liner being in abutting engagement with the end portion 12 of the body member.

The end portion 12 of the body member is provided axially with a cylindrical recess 23 which forms a bearing for a reduced portion 24 at one end of a shaft 25. Shaft 25 extends at the other end through an axially disposed flanged aperture 27 formed in the closure member 21, this aperture being provided with a bushing 28 of bearing material which forms a second bearing for a cylindrical portion 30 of the shaft 25.

Between the portions 24 and 30 the shaft is formed with an enlarged portion 35 which is provided with a series of longitudinally extending splines 36. Within the cylinder there is provided a piston member 40 which has an axial aperture through which the splined portion 35 of the shaft extends, it being understood that the aperture in the piston is shaped correspondingly to the shaft, whereby the piston will readily slide axially of the shaft but is prevented from rotating relative thereto.

The outer periphery of the piston member is provided with a number of square sectioned helical projections or screw threads 41 which are in engagement with correspondingly shaped grooves 42 formed in the internal periphery of the liner 15, the arrangement being such that relative rotational movement between the shaft and the cylinder will cause an axial movement of the piston member 40 within the said cylinder.

With liner 15 integral with the cylinder portion 11 of the body member, the tool cost for manufacture of this shock absorber is excessive. However, when the part carrying the grooves 42 is formed separate from the body it may be die-cast and thus produced in quantities. While the die-casting may prove somewhat porous this will be no particular drawback since it is reinforced or backed by the portion 11 of the body member 10.

Further, with this removable liner, in combination with the other structure shown the liner and piston if worn may be renewed by any repair man without disconnecting body 10 from an automobile chassis or other support and without disturbing the metering adjustment of needle valve 90. The pointer 95 would be removed and the other parts including the shaft and piston removed from the body 10, the liner 15 drawn out of the body, a new liner and piston placed in the body and on the shaft 25 respectively and the parts reassembled to close the body which would then be refilled with the desired fluid medium, no adjustments being necessary since the adjustment of valve 90 need not be disturbed.

The external periphery of the body member 11 is screw threaded for receiving a peripheral portion 50 of a cup-like cover member 51 which with the closure 21 forms a double cover for the cylinder or body 10. This cover member being provided with an end portion 52 which has an axial aperture through which the shaft 25 extends. The portion of the shaft 25 which projects externally of the cover member is longitudinally grooved for receiving an operating crank arm 55, the extremity of the shaft being provided with a screw threaded portion 56 which is of reduced diameter which receives the closure nut 57 serving to retain the crank arm 55 in the keyed engagement with the shaft. The cover member 51 is provided near its upper corner with a flattened portion 60 having a filling orifice which is screw threaded for receiving a closure member 61.

It will be seen that the interior surface of the flange or peripheral portion of the cup-like member 51 is provided with a groove for receiving packing 65, and that a packing ring 66 is provided between the end of the bearing bush 28 and the aperture in the end portion 52 of the cover member, said aperture and end of the bearing bush being shaped in such a manner that the screwing of the cover 51 onto the body member will serve to compress the packing 66 into fluid tight engagement with the shaft portion 30. Shims 68 are provided against the shoulders formed on the shaft 25 at the junction of the portion 35 thereof with the portions 24 and 30, these shims lying respectively between said shoulders and the end portion 12 of the body member and the apertured portion and the bearing brass 28 of the closure member 21.

The piston member 40 is provided with fluid transfer passages 70, these passages extending through the piston for communicating the opposite ends of the working cylinder. Each of these passages is provided with a ball valve 71 which allow fluid to flow through the passage only in a direction from the front or right hand end of the cylinder to the rear or left hand end of the cylinder. It will be seen that the balls of the ball valves are disposed in enlarged portions of the passages 70 and are adapted to seat against shoulders 72 which are formed at the junction of said enlarged portions with small diametered portions of the passages. Pins 73 extend through the piston member across the large diametered portions of the passages 70 in a manner permitting the balls to clear the seats 72 but serving to retain the balls within the large diametered portions of the passages 71.

The periphery of the portion 35 of the shaft is provided with groves 80 which are located substantially midway between the ends of the working cylinder. These grooves are of slightly greater length than the width of the central adjacent portion of the piston, and the ends of the grooves are inclined or tapered at 81 such that the groove gradually diminishes in depth. The portion 35 of the shaft is provided with an axial bore 85 which communicates with radial bore 86 at each end of said portion 85, the radial portions being open to the interior of the working cylinder at the extreme ends of said cylinder.

The axial bore 85 in the portion 35 of the shaft is extended by a counter bore 88 of larger diameter which opens to the external end 56 of the shaft, and at the junction of the bores 85 and 88 there is provided a conical valve seat 89. A metering pin 90 has a screw threaded engagement at 91 with the bore 88, the inner end of the metering pin having a valve face 92 which is adapted to co-operate with the valve seat 89, said seat being located at the junction of the bore 85 with one radial bore 86. The other end of the metering pin 90 projects through an aperture in the closure nut 57 and is provided with a pointer 95 which is adapted to co-operate with markings on the surface of the closure nut 57, said closure nut being provided with a projection 96 which is adapted for co-operating with the pointer 95 for indicating a determined position of the valve face 92 with respect to the seat 89. The end portion 56 of the shaft is enlarged internally and screw threaded for receiving two sleevelike members 98 which are adapted for compressing a ring of packing material 99 located around the metering pin 90.

The closure member 21 is provided in its lower portion with a through passage 100 which is of sufficient dimension to allow a comparatively free transference of working fluid to the cylinder from the annular reservoir chamber which is formed between the cover member 50 and the closure member 21. This passage 100 is provided with a ball valve 101 of similar construction to the ball valve provided in the passages 70, the valve 101 being arranged such that unrestricted passage of fluid from the expansion chamber into the cylinder is permitted, but movement of fluid in a reverse direction through the passage 100 is prevented. The passage 100 therefore serves as an inlet to the working chamber. On the opposite side, the closure member 21 is provided with a through passage 105 which is of very fine cross-sectional area, but otherwise unrestricted, and this passage therefore serves as an outlet from the cylinder, and will permit a slow exit of fluid therefrom when abnormal pressure is developed.

The body member 10 is provided with lugs 110 at its rear end for rigidly securing the rear end against the longitudinal frame members or other convenient part of the automobile, and it will be understood that the free end of the crank 55 is adapted to be connected with the axle or other part of the running gear of the vehicle in a manner such that both downward and upward movement of the axle will be transmitted to said lever arm.

In operation displacements of the axle of the vehicle relative to the chassis will cause the shaft 25 to rock or rotate, and this movement will be transmitted to the piston 40. By reason of the screw threaded engagement of the piston with the liner member 15, a rocking or rotational movement of the shaft will cause an axial movement of the piston within the cylinder, and in the form illustrated the arrangement is such that a downward movement of the axle will cause a movement of the piston towards the rear or chassis end of the cylinder, and the pitch of the screw threads is such that a movement of the arm 55 through one hundred degrees (100°) will cause the piston to move from one extreme position to the other extreme position.

When the axle of the vehicle is in its normal position the piston 40 occupies a position between the ends of the grooves 80, and it will be seen that when only minor deflections of the axle take place, such as occur on well paved road surfaces, the piston is allowed to move with little or no restriction, the fluid medium within the cylinder being transferred from one side of the piston to the other side thereof through the passages 80. When however, greater deflections of the axle occur, the piston will move sufficiently to close one end of the passages 80 and thus render said passages temporarily inoperative. It will be seen that when a downward movement of the axle occurs, sufficient to close the passages 80, the only exit for the fluid in the rear end of the cylinder is by way of the passages 86 and passage 85, the passages 70 through the piston becoming closed by the valves 71.

The downward movement of the axle is therefore retarded to a comparatively great extent, depending on the setting of the valve 92. On the rebound action of the springs the piston is moved towards the front of the cylinder, and there is a comparatively little restriction of this movement, owing to the opening of the ball valves 71 and the passage of the fluid through both the passages 70 and also the passages 85 and 86.

With normal operation of the shock absorber only a comparatively negligible body of working fluid will pass through the outlet opening 105, and it is to be noted in this connection that the forward end of the cylinder is not subjected to the pressure that is obtained in the rear end, owing to the comparatively lesser checking of the upward movement of the axle. The passage 105 however, allows sufficient fluid to escape from the cylinder when expansion of the fluid occurs owing to climatic condition or any other cause, it being understood that the expansion chamber is not completely filled with the fluid so as to leave a body of air trapped therein. If for any reason the volume of fluid in the cylinder diminishes it is quickly replenished through the inlet passage 100 as soon as a movement of the piston towards the rear end of the cylinder occurs.

In this connection it is to be noted that the chamber 110 may be considered as the low pressure chamber while chamber 111 is the medium pressure chamber and chamber 112 is the high pressure chamber. As the piston 40 moves toward the left or into the high pressure chamber, the pressure in chamber 111 lessens. This results in drawing of fluid from the low pressure chamber 110 into the medium pressure chamber 111 through the passage or port 100. Then as the piston moves in the opposite direction fluid from medium pressure chamber 111 is pumped into the high pressure chamber 112 through ports or passages 70, the ball valves 71 moving off their seats 72 during this stroke of the piston.

Due to this action the high pressure chamber 112 will be maintained full at all times. Also owing to the relative locations of the different pressure chambers a minimum of packing may be used. The high pressure chamber 112 is at the solid end of member 10 and any leakage from the chamber must be small and between the cylindrical portion 11 of such member and the liner 15. Escape in this direction but leads to the threaded connection at 20, between the head or closure 21 and the portion 11, and into the low pressure chamber 110. The only really exposed chamber is the low pressure chamber 110 and this is easily sealed by the threaded connection and seal 65 between cup 51 and the cylindrical portion 11.

From the above description it will be appreciated that the shock absorber provides for a large volumetric capacity of working fluid within the cylinder, and that further the effective area of the piston is large, compared with the well known vane type shock absorber in which an axial shaft carries rigid vanes which are moved between fixed vanes carried by an enclosing cylinder. In view of this it will be appreciated that an effective shock absorbing action can be obtained with a shock absorber according to the present invention by using only comparatively low operating pressures, with the advantage that not only can the strength and thickness of the parts be reduced but that further the working clearance can be greater and there is no longer the necessity for extreme accuracy in the formation of the co-engaging surfaces of the moving parts.

A still further result from the use of lower working pressures is that light oil may be used for the working medium, in place of the comparatively viscous mixtures that are at present commonly used in vehicle shock absorbers. A still further advantage which is obtained is that the dimensions of the transfer passages can be enlarged and undue heating of the working medium during operation is avoided, with also the reduction in manufacturing expense due to the fact that said passages need not be formed to within said close limits of accuracy.

From the foregoing it will be apparent that by means of this invention I have provided an improved shock absorber that obtains the advantages of large size without actually increasing overall dimensions. In this connection it may be stated that with a shock absorber as illustrated the effective area of the rotor or piston is in excess of 300% as great as is obtained in a well known type of vane type shock absorber having equal external dimensions. Further, the fluid capacity of the working cylinder of a shock absorber as illustrated herein is approaching of 300% of the working capacity of such vane type shock absorber, with a corresponding increase in the relative volumetric capacity of the expansion chambers.

In Fig. 6 is shown a slight modification of the invention. Here, the portion 30$^a$ of the shaft 25 is solid, the bore 85 being not extended into portion 30$^a$. In this arrangement the shaft 25 would be drilled from the rear and subsequently pluged as at 30$^b$. This structure would be used when the improved shock absorber was being manufactured for vehicles of known weight and construction. The provision of the metering pin 90 provides a convenient means for adjusting the effective cross-sectional area of the bore 85, and therefore, renders the shock absorber adapted for sale as an accessory which can be installed on vehicles having widely differing weights and constructions of spring suspension.

What is claimed is:

1. A shock absorber comprising a cylinder, a shaft extending into said cylinder, a piston in said cylinder, a liner within said cylinder, said liner having longitudinal ribs for engaging grooves formed in the interior periphery of said cylinder, a helical screw thread formed in the interior periphery of said liner, a complementary screw thread formed on the periphery of said piston, said piston having an axial aperture in sliding engagement with said shaft.

2. A device for controlling the operation of vehicle suspension systems, said device comprising a cylinder having one end closed, a shaft mounted for rotation in said cylinder and having one end engaged in a bearing recess in the closed end thereof, a liner in said cylinder having an axially ribbed engagement with the interior periphery of said cylinder, one end of said liner abutting the closed end of said cylinder, a closure member for the other end of said cylinder having a screw threaded engagement with the periphery of said cylinder and adapted to abut the other end of said liner, said shaft extending through said closure member in bearing engagement with an aperture provided therein, a piston within said cylinder having a screw threaded engagement with the interior periphery of said liner and having an axial aperture in sliding engagement with a splined portion of said shaft.

3. A shock absorber comprising a cylinder, a shaft extending axially into said cylinder, a liner within said cylinder said liner being formed as a die-casting and having a helical screw thread on its inner periphery and shoulders on its outer periphery for engagement by corresponding shoulders associated with the interior periphery of said cylinder, a piston within said cylinder, said piston being formed as a die-casting and having a helical screw thread on its outer periphery for engagement with said first mentioned screw thread and having an axial aperture of non-circular cross section for engaging a correspondingly shaped portion of said shaft.

4. A shock absorber comprising a cylinder, a shaft extending into said cylinder, a piston within the cylinder and slidably mounted on the shaft, a liner within said cylinder and in engagement with the inner wall thereof and removable therefrom, a screw thread on the inner periphery of said liner, and a complementary screw thread on the periphery of the piston.

5. A shock absorber comprising a cylinder, a shaft extending into said cylinder, a piston within the cylinder and slidably mounted on the shaft, a liner within the cylinder and interlocking therewith to prevent relative rotative movement, said liner with-drawable from said cylinder, a screw thread on the inner periphery of said liner, and a complementary screw thread on the periphery of the piston.

Signed a Bridgeport, in the county of Fairfield and State of Connecticut, this 14th day of April, A. D. 1930.

ALEXANDER McNAB.